United States Patent [19]

Leutz

[11] Patent Number: 4,475,744

[45] Date of Patent: Oct. 9, 1984

[54] TELESCOPING STEERING SHAFT WITH ADJUSTED LASH

[75] Inventor: Donald C. Leutz, Coldwater, Mich.

[73] Assignee: Douglas Components Corporation, Bronson, Mich.

[21] Appl. No.: 498,759

[22] Filed: May 27, 1983

[51] Int. Cl.³ .............................................. B62D 1/18
[52] U.S. Cl. ..................... 280/775; 74/493; 74/531; 180/79; 403/104; 403/374
[58] Field of Search ............... 280/775, 776; 180/79; 74/493, 531; 403/104, 374

[56] References Cited

U.S. PATENT DOCUMENTS

| | | | |
|---|---|---|---|
| 3,276,287 | 10/1966 | Albrecht | 74/493 |
| 3,434,368 | 3/1969 | Runkle | 74/531 |
| 3,628,396 | 12/1971 | Grobowski | 280/775 |
| 3,791,223 | 2/1974 | Treichel et al. | 74/531 |
| 4,257,624 | 3/1981 | Hansen | 403/374 |
| 4,396,207 | 8/1983 | Okamoto | 280/775 |
| 4,402,236 | 9/1983 | Nishikawa | 74/531 |
| 4,422,346 | 12/1983 | Nishikawa | 280/775 |

Primary Examiner—Richard A. Bertsch
Attorney, Agent, or Firm—Pearne, Gordon, Sessions, McCoy, Granger & Tilberry

[57] ABSTRACT

A telescoping steering column is provided of the type wherein a wedge plug and innermost shaft portion are axially wound relatively to each other by rotation of a threaded rotatable control rod to thereby lock and release the innermost shaft portion relative to another shaft portion. First and second stop means are provided to respectively stop the control rod and the one of the two elements (innermost shaft portion or wedge plug) that is not threaded to the threaded control rod against relative axial movement in our direction and in the opposite direction. The first and second stop means allow a limited axial lost motion between the rotatable control rod and the said one element when the direction of the rotatable control rod is reversed so as to axially disengage one of the stop means and move the rod axially toward the other by the stop means.

9 Claims, 7 Drawing Figures

U.S. Patent   Oct. 9, 1984   Sheet 1 of 2   4,475,744
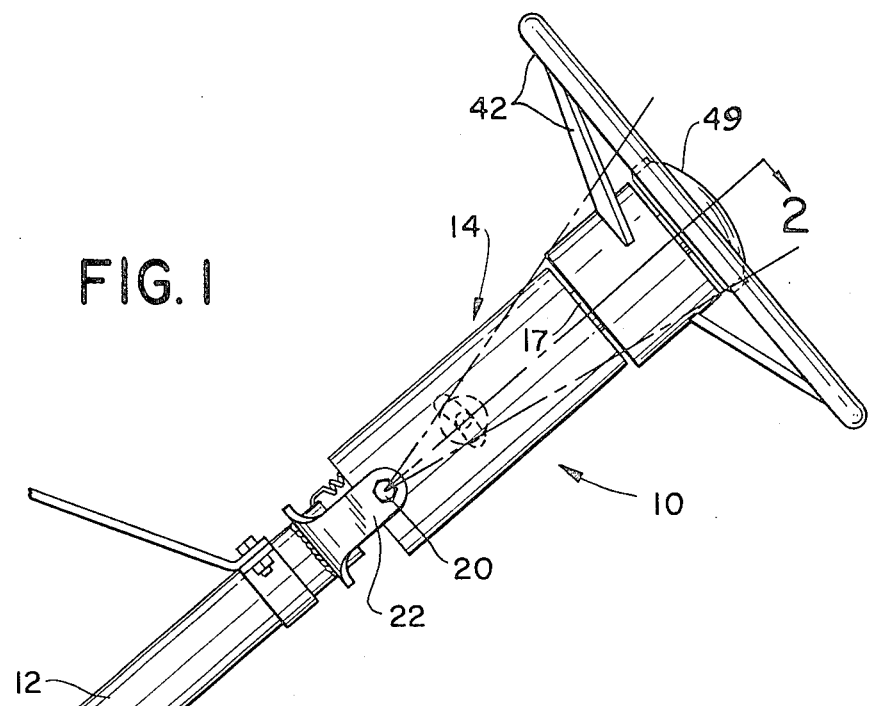
FIG. 1
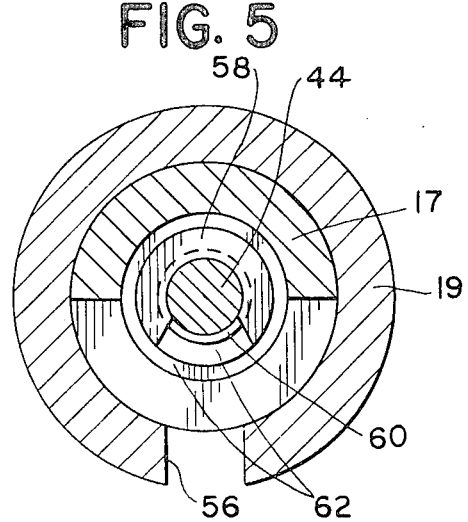
FIG. 5
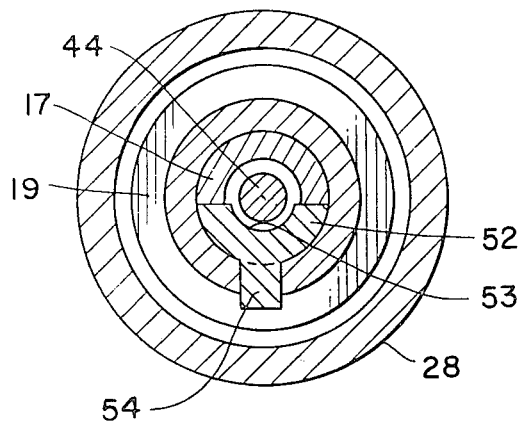
FIG. 4
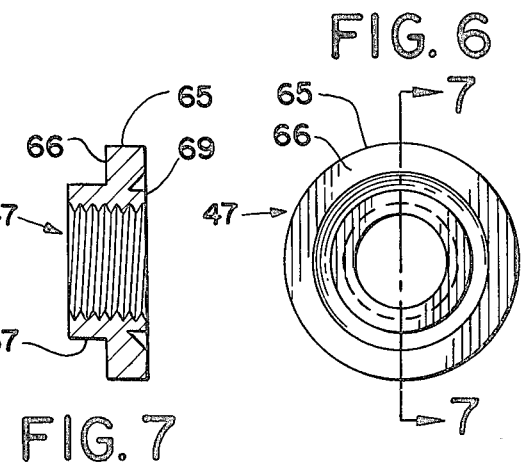
FIG. 6
FIG. 7

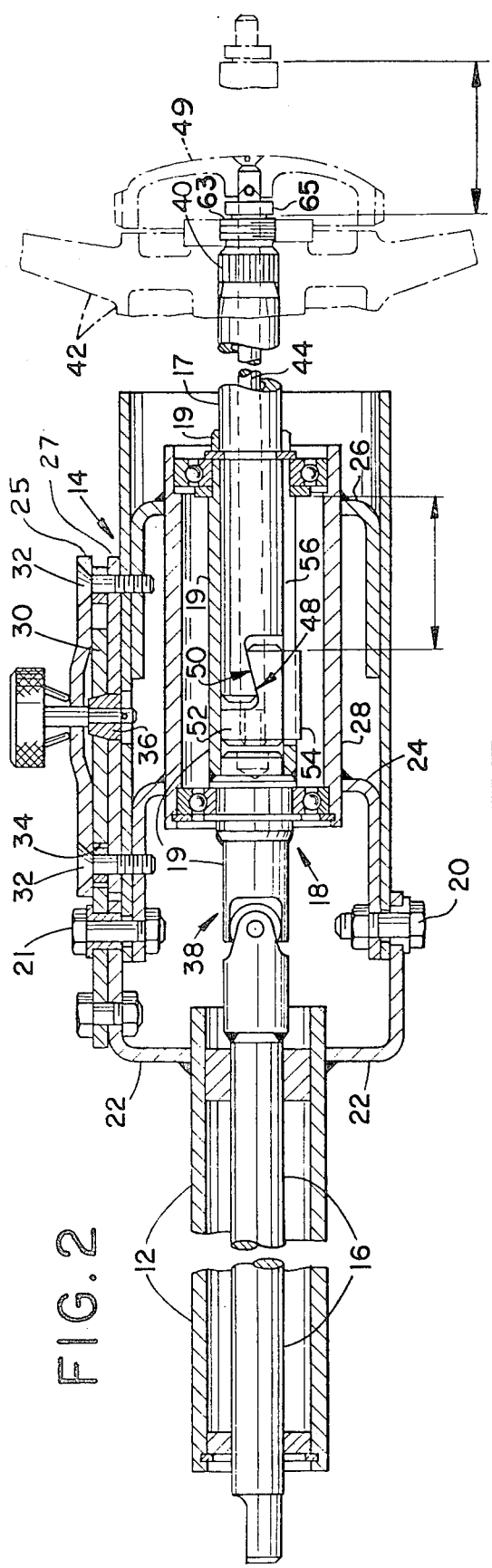
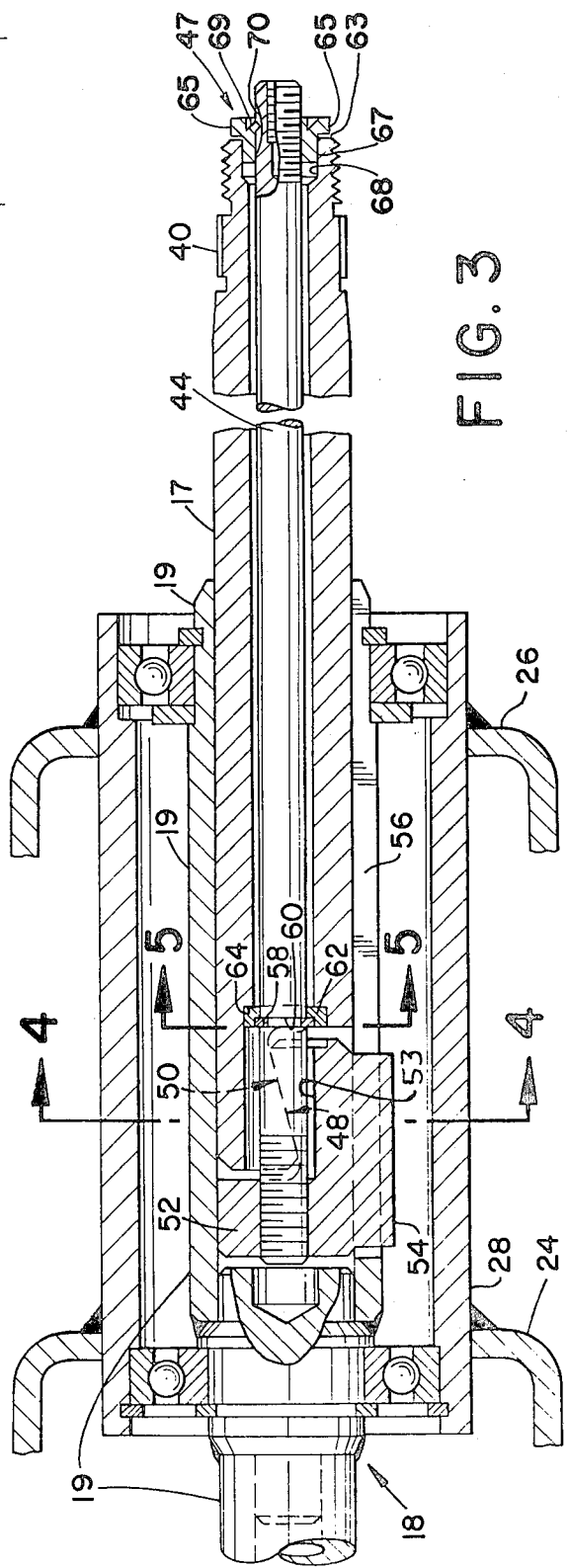

TELESCOPING STEERING SHAFT WITH ADJUSTED LASH

BACKGROUND OF THE INVENTION

This invention relates to an adjustable steering column for a vehicle, and more particularly to the type of column which can be adjusted, within a limited range, between an infinite number of degrees of telescoping or longitudinal extension and preferably also between several positions of vertical tilt.

It is known to provide tilting and telescoping steering columns for industrial and agricultural vehicles, as well as for automobiles. Generally, these have been provided for the convenience of the operator. The ability to adjust a steering wheel to various positions of extension or of both tilt and extension contributes to convenience by allowing operators to adjust for most comfortable steering and for easiest entrance and egress. Different operators may, and often do, prefer different adjustments, or the same operator may prefer different adjustments for different working conditions; for example, he or she may prefer to stand while operating a tractor or other vehicle for one purpose, and to sit while operating it for another purpose.

Unfortunately, the adjustability intended to be provided by telescoping steering columns of known design suitable for industrial and agricultural vehicles has often been, in important respects, more theoretical than practical. In particular, adjustment between different degrees of telescoping or longitudinal extension has often been difficult for the operator to accomplish. Indeed, such adjustment may be impossible to accomplish without pounding the column with a hammer, heavy wrench, or other implement, to thereby apply brute force to "break" the column away from a locked condition at its then-set degree of telescoping so that it can be shifted and set at another degree of telescoping. At the new setting, the column may again establish a locked condition which will again have to be "broken" by brute force upon subsequent adjustment. Under such circumstances, adjustment may not be worth the bother, particularly where true convenience would require frequent adjustment back and forth between positions.

Examples of prior art columns include Treichel et al. U.S. Pat. No. 3,791,223 and Hansen U.S. Pat. No. 4,257,624. Each of these patents illustrates a telescoping steering column whose length is adjustable over a continuous range between upper and lower limits of full extension and full retraction. In each of these patents, cam surfaces, a wedge nut (82 or 32), and a cooperating shaft member interact to wedge the nut and shaft member against an outer shaft member and lock the linkage in any selected degree of telescoping adjustment. However, such lock may be difficult to "break". It is intended that backing off or rotation of a lock-unlock knob (74 or 40) in the unlocking direction will release the linkage from the locked condition, but when a tight lock exists, the intended result may not occur. Instead, the control rod (72 or 37) may shift axially in such a way as to allow relative movement between the threadedly engaged nut and control rod without releasing the locked condition. The "brute force" approach of pounding or hammering may then be required to break the linkage from its locked condition.

More recently, steering columns have been provided which minimize or totally eliminate the problem of breaking away from locked condition. In such improved columns, means is provided for constraining a threaded control rod member against certain relative axial movement while it is being rotated in the direction intended to release the column from locked condition. Such constraint is imposed in such a way that axial movement of a wedge nut engaged with the rod is positively forced, thereby forcing a breakaway from the locked condition. The result is a telescoping steering column whose length can be adjusted over a continuous range of column lengths and with much greater convenience than before. Examples are shown in U.S. application Ser. No. 369,495 filed Apr. 19, 1982, of common assignee.

However even in such improved columns, problems remain in respect of convenience of use because of the uncertain and excessive amount of rotation required to lock the column in adjusted position or to force the breakaway from locked condition. While both locking and breakaway will eventually occur in a positive manner, the action of the linkage tends to feel mushy and uncertain to the user because of the excessive rotation required to complete the action. The time and effort required to complete higher degrees of rotation also detract from convenience of use.

SUMMARY OF THE INVENTION

According to the present invention, an improved steering column is provided with lash adjustment means to define a predetermined degree of allowed limited axial lost motion between certain parts of the linkage. The result is a telescoping column that readily locks and unlocks with a positive feel and with very little rotary motion.

BRIEF DESCRIPTION OF THE DRAWINGS

FIG. 1 is a side elevation of a steering column illustrating the invention.

FIG. 2 is a fragmentary cross section, on an enlarged scale, taken on the plane of line 2—2 in FIG. 1.

FIG. 3 is a view on a still larger scale of a portion of FIG. 2, and with some additional cross-sectioning of the illustrated parts.

FIG. 4 is a cross section taken on the plane of line 4—4 in FIG. 3.

FIG. 5 is a cross section, on a further enlarged scale, taken on the plane of line 5—5 in FIG. 3.

FIG. 6 is an end view, on a still larger scale, of a threaded bushing adapted to be mounted on the control rod of the linkage and used for lash adjustment.

FIG. 7 is a cross-section taken on the plane of line 7—7 in FIG. 6.

DETAILED DESCRIPTION OF THE DRAWINGS

In the following description, numbers within parentheses refer to FIGURE numbers.

A steering column generally indicated at 10 (1) includes a lower column portion 12 (1, 2) fixed against rotation and a lower steering shaft portion 16 (2) mounted within the lower column portion and adapted to control steering means for the vehicle. An upper column portion generally indicated at 14 (1, 2) is pivotally mounted to the lower column portion 12 by pivot bolts 20 (1, 2) and 21 (2) via a lower column bracket 22 (1, 2) fixed to the lower column portion 12.

The upper column portion 14 includes brackets 24 and 26 (2, 3) and a bearing support sleeve 28 (2, 3, 4). A fixed detent plate or arm 30 (2) is bolted to the lower column bracket 22 and extends upwardly between moving detent plates 25 and 27 (2). The moving detent plates are joined by suitable threaded fasteners 32 and are held apart by spacer sleeve through which the threaded fasteners pass, as shown. The spacer sleeve associated with the lowermost threaded fastener 32 is received within an arcuate slot 34 (2) formed in the fixed detent arm 30. The slot 34 is seen in cross section in the drawings. This slot accommodates the pivoting movement of the moving detent plates 25, 27 relative to the fixed detent arm 30. A detent proper 36 (2) is received in any one of several mating holes formed in the fixed detent arm 30 to thereby fix the degree of tilt of the steering column. The detent is temporarily released by depression of the associated knob and shaft which are normally spring-biased to their extended positions, as illustrated, thus normally maintaining the detent proper in the seated position.

The lower steering shaft portion 16 is connected to an upper steering shaft portion generally indicated at 18 (2, 3) at a universal joint 38 (2). The upper steering shaft portion 18 includes an inner sub-portion 17 (1-5) and an outer sub-portion 19 (2-5). Sub-portions 17 and 19 are associated with each other in telescoping relationship. The lower end of the lower telescoping subportion is directly connected to the universal joint 38. Means such as the splines 40 (2, 3) are provided for mounting a steering wheel 42 (1, 2) at the upper end of the upper sub-portion.

A manually rotatable control rod 44 (2-5) is mounted in and extends through the upper sub-portion 17. Manually drivable rotation means such as the knob 49 (1, 2) is provided at the upper end of the control rod 44. The knob may be keyed to the control rod by a suitable slot and pin connection, as indicated in FIGS. 2 and 3. The control rod 44 is threaded at both its upper and lower ends, as indicated in the drawings.

In the illustrated embodiment, the upper sub-portion 17 will be seen to be the innermost of the two sub-portions 17 and 19 of the upper shaft portion 18. The sub-portion that is innermost, in this case sub-portion 17, is provided at its end with inclined cam surface 48 (2, 3) which is rentrant in the illustrated preferred embodiment. A wedge plug 52 (2-4) is telescoped within the outermost of the sub-portions of the upper shaft portion, which, in the embodiment being described, is the lower sub-portion 19. The wedge plug 52 has an inclined cam surface 50 (2, 3) which is engageable with the cam surface 48. The wedge plug 52 may be provided with a tongue 54 (2-4) which is received in a slot 56 (2, 3, 5) formed in the shaft sub-portion 19 in order to key the members 52 and 19 against relative rotation. The upper end of the wedge plug 52 has a longitudinal groove 53 (4, 5) which accommodates the control rod 44. The lower end of the wedge plug 52 is threadedly engaged with the rotatable control rod 44 for intended axial shifting of the wedge plug and rotatable control control rod, relative to each other and in response to rotation of the rod, in direction for respective locking and releasing movement. In locking movement, the wedge plug and innermost sub-portion of the shaft are axially shifted relatively to each other to force the inclined cam surfaces 48 and 50 together and thereby force the wedge plug 52 and the innermost sub-portion 17 into locking engagement with the outermost sub-portion 19. In the intended releasing movement, the wedge plug and innermost sub-portion of the shaft are axially shifted in a releasing direction to release such engagement. However, in the apparatus as so far described, such releasing movement is not forced to occur by, and may not be accomplished by, the rotation of the control rod in the rotational direction corresponding to intended relative axial shifting of the wedge plug and innermost shaft sub-portion for releasing movement. Instead, rotation of the knob 49 so as to turn the control rod 44 in the intended releasing direction may merely cause the rod 44 to start to turn further into its threaded engagement with the wedge plug 52 without effecting any relative shifting between the wedge plug 52 and innermost shaft sub-portion 17.

This is prevented by first stop means for stopping the rod and innermost shaft sub-portion against relative axial movement (preventing the rod from moving downwardly with respect to the innermost shaft sub-portion) during rotation of the rod 44 in the release direction, thereby causing relative axial shifting of the wedge plug 52 and innermost shaft sub-portion 17 to be positively forced by rotation of the rod in the release direction.

Furthermore, second stop means is provided for stopping the rod and innermost shaft sub-portion against relative axial movement (preventing the rod from moving upwardly with respect to the innermost shaft sub-portion) during rotation of the rod in the tightening direction. The directions associated with loosening and tightening are, of course, opposite directions of relative axial movement, so it will be understood that the first stop means stops the parts against relative axial movement in one direction, and the second stop means stops the parts against relative axial movement in the opposite direction.

The first and second stop means allow a limited axial lost motion between the rod and the innermost shaft sub-portion when the direction of rotation of the rotatable control rod is reversed so as to axially disengage one of said stop means and move the rod axially toward engagement of the other of said stop means.

The first and second stop means include respectively an axially upwardly facing first shoulder 63 (2, 3) associated with the upper end of the innermost shaft sub-portion 17 and an axially downardly facing second shoulder 64 (3) associated with a lower part of the innermost shaft sub-portion 17.

The first and second stop means further include respectively a first shoulder-engaging means mechanically tied to the control rod 44 and associated with the upper end of the innermost shaft sub-portion 17 for engagement with the first shoulder 63 and a second shoulder-engaging means mechanically tied to the control rod 44 and associated with the aforesaid lower part of the innermost shaft sub-portion 17 for engagement with said second shoulder.

The first shoulder-engaging means is provided by the face 66 (6, 7) on flange 65 (2, 3, 5, 6) of threaded bushing 47 (3, 6, 7) which is received on the upper threaded end of the control rod 44. The cylindrical boss 67 (3, 7) of the threaded bushing is slidingly and rotatably received in bore 68 (3) formed at the upper end of innermost shaft sub-portion 17, and thereby affords sliding and rotary support to control rod 44 at its upper end.

The second shoulder engaging means is provided by a snap ring or retaining ring 58 (3, 5) and cage or ring retainer 62 which surrounds and backs the ring 58 and engages the shoulder 64. The ring 58 is received in a ring groove 60 (3, 5) formed in the control rod 44.

When the rod 44 is turned in the tightening direction to tend to move the cam surfaces 48 and 50 together, such moving together is positively forced by engagement of the ring 58 and retainer 62 against the shoulder 64.

The invention provides take-up means for precisely adjusting and setting the maximum axial distance between the engaging means for the first and second shoulders 63 and 64, i.e. between shoulder 66 and cage 62. Take-up is afforded by the threaded connection between the bushing 47 and the upper end of the rod 44. The bushing 47 is provided with a lip 69 (3, 7) formed in one end of the bushing. When the bushing 47 is installed on the rod 44, the lip 69 surrounds the rod and is immediately adjacent thereto. A longitudinally extending keying slot or groove 70 (3) is cut in rod 44. Any selected portion of the annular extent of the lip 69 can be staked into the keying slot 70. When the bushing 47 is threaded onto the rod 44 to just the desired extent, the portion of the lip 69 then overlying the keying slot 70 is staked into the slot, thereby locking the bushing 47 at one position of threaded engagement with the rod 44. Thereafter, the bushing 47 and the rod 44 together rotate and move axially as a single part.

The adjusting and setting procedure may be carried out after assembly of the entire steering column, or after assembly of the portion thereof comprising the upper shaft sub-portions 17 and 19 and associated internal parts including the rod 44, wedge plug 52, snap-ring 58, ring retainer or cage 62 and threaded bushing 47. Rod 44 is rotated by the knob 49, or by any suitable means drivingly engageable with the top end of the rod 44 in a manner similar to the illustrated driving engagement by the knob 49, until wedge plug 52 moves back to locked position. At this point, threaded bushing 47 is threaded down tightly onto a shim (not shown) of between 0.001 and 0.002 inches thickness (or between about 0.026 and 0.050 mm thickness) placed between the bushing 47 and the axially upwardly facing first shoulder 63. The apposed portion of the lip 69 is then forced into the groove 70 with a staking tool (not shown). The shim is then removed.

This adjustment of the maximum axial distance between the first and second shoulder engaging means 66 and 62 predetermines the degree of limited axial lost motion between the rod 44 and the innermost shaft sub-portion 17 allowed by the first and second stop means. (It will be understood from the preceding description that the first and second stop means respectively include the element pair 63, 65 and the element pair 64, 62 and respectively stop the parts against relative axial movement in one direction and against relative axial movement in the opposite direction.) The degree of lost motion corresponds to, and is determined by, the thickness of the shim. The effect of the procedure is to adjust lash out of the system. The result is that the column readily lock and unlocks with a positive feel for the user and with very little rotary motion.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An adjustable steering column for a vehicle comprising an upper column portion, an upper steering shaft portion rotatably mounted within the upper column portion, said upper steering shaft portion including upper and lower sub-portions at least one of which is a quill shaft, said sub-portions being associated in telescoping relationship with one being the outermost of the two and the other the innermost, steering wheel mounting means at the upper end of the upper telescoping sub-portion, a manually rotatable control rod mounted in and extending through the upper sub-portion and having manually drivable rotation means at its upper end and screw threads adjacent its lower end, an inclined first cam surface at an end of the innermost of the sub-portions, a wedge plug telescoped within the outermost of said sub-portions, the wedge plug having an inclined second cam surface engageable with the first cam surface whereby axial shifting of the wedge plug in a locking direction with respect to the said innermost sub-portion forces the inclined first and second cam surfaces together to force the plug and said innermost sub-portion into locking engagement with said outermost sub-portion, and axial shifting of the wedge plug in a releasing direction with respect to said innermost sub-portion releases said locking engagement, the wedge plug and said innermost sub-portion surrounding the lower end of the rotatable control rod with one of them threadedly engaged with the control rod for axial shifting of the wedge plug and innermost sub-portion, relative to each other and in response to rotation of the rod, in directions for respective locking and releasing movement, first stop means for stopping the rotatable control rod and the one of said innermost sub-portion and wedge plug that is not threadedly engaged with the control rod against relative axial movement in one direction, second stop means for stopping said control rod and said one of said elements against relative axial movement in the opposite direction, said first and second stop means allowing a limited axial lost motion between said rotatable control rod and said one element when the direction of rotation of said rotatable control rod is reversed so as to axially disengage one of said stop means and move the rod axially toward engagement of the other of said stop means, said first and second stop means including respectively an axially upwardly facing first shoulder associated with the upper end of said one element and an axially downwardly facing second shoulder associated with a lower part of said one element, said first and second stop means further including respectively a first shoulder-engaging means mechanically tied to said rotatable control rod and associated with the upper end of said one element for engagement with said first shoulder and a second shoulder-engaging means mechanically tied to said rotatable control rod and associated with the said lower part of said one element for engagement with said second shoulder, and take-up means associated with said control rod and one of said first and second shoulder-engaging means for adjusting the axial distance between said first and second shoulder engaging means to thereby predetermine the degree of limited axial lost motion between the rotatable control rod and said one element allowed by said first and second stop means.

2. Apparatus as in claim 1, in which said first and second stop means stop the rotatable control rod and said innermost sub-portion against relative axial movement.

3. Apparatus as in claim 2, in which the upper and lower sub-portions of the upper steering shaft portion comprise an upper quill shaft and a lower quill shaft, and the upper quill shaft is the innermost of the two and is telescopingly received within the lower quill shaft which is the outermost of the two.

4. Apparatus as in claim 1, including means for permanently fixing the adjusted position of said take-up means to thereby fix the degree of predetermined limited axial lost motion between the rotatable control rod and said one element.

5. In an adjustable steering column for a vehicle, a lower quill shaft, an upper quill shaft telescoped therein, the upper quill shaft having an inclined first cam surface at its lower end, a manually rotatable control rod extending through the upper quill shaft and having screw threads on its lower end, the upper quill shaft being free of engagement with said screw threads, a wedge plug telescoped within the lower quill shaft between the lower end thereof and the upper quill shaft, the wedge plug having an inclined second cam surface engageable with the first cam surface, said wedge plug being threadedly engaged with the screw threads at the lower end of the rotatable control rod, first stop means for stopping the rotatable control rod and upper quill shaft against relative axial movement in one direction, second stop means for stopping the rotatable control rod and the upper quill shaft against relative axial movement in the opposite direction, said first and second stop means allowing a limited axial lost motion between the rotatable control rod and the upper quill shaft when the direction of rotation of the rotatable control rod is reversed so as to axially disengage one of said stop means and move the rod axially toward engagement of the other of said stop means, said first and second stop means including respectively an axially upwardly facing first shoulder associated with the upper end of the upper quill shaft and an axially downwardly facing second shoulder associated with a lower part of the upper quill shaft, said first and second stop means further including respectively a first shoulder-engaging means mechanically tied to said rotatable control rod and associated with the upper end of the upper quill shaft for engagement with said first shoulder and a second shoulder-engaging means mechanically tied to said rotatable control rod and associated with the said lower part of the upper quill shaft for engagement with said second shoulder, and take-up means associated with said control rod and one of said first and second shoulder-engaging means for adjusting the axial distance between said first and second shoulder-engaging means to thereby predetermine the degree of limited axial lost motion between the rotatable control rod and the upper quill shaft allowed by said first and second stop means.

6. Apparatus as in claim 5, including means for permanently fixing the adjusted position of said take-up means to thereby fix the degree of predetermined limited axial lost motion between the rotatable control rod and the upper quill shaft.

7. Apparatus as in claim 6, in which said take-up means includes a bushing rotatably and slidingly received in the upper end of said upper quill shaft and threadedly engaged with said rotatable control rod.

8. Apparatus as in claim 7, including means to lock said bushing at one position of threaded adjustment relative to the rotatable control rod to thereby fix the degree of predetermined limited axial lost motion between the rotatable control rod and the upper quill shaft.

9. Apparatus as in claim 8, said means to permanently lock including a longitudinally extending keying slot formed in the rotatable control rod and an annular staking lip formed in one end of said bushing in surrounding relationship with the rod and immediately adjacent thereto, any selected portion of the annular extent of said lip being stakable into said keying slot to thereby lock the bushing at one position of threaded adjustment with respect to the rotatable control rod.

* * * * *